(12) United States Patent
Ueda et al.

(10) Patent No.: US 10,186,044 B2
(45) Date of Patent: Jan. 22, 2019

(54) PERSON TRACKING METHOD AND PERSON TRACKING DEVICE

(71) Applicant: PANASONIC INTELLECTUAL PROPERTY MANAGEMENT CO., LTD., Osaka (JP)

(72) Inventors: Junko Ueda, Kanagawa (JP); Masamoto Tanabiki, Kanagawa (JP); Yoshimitsu Aoki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/535,948

(22) PCT Filed: Feb. 17, 2016

(86) PCT No.: PCT/JP2016/000817
§ 371 (c)(1),
(2) Date: Jun. 14, 2017

(87) PCT Pub. No.: WO2016/139906
PCT Pub. Date: Sep. 9, 2016

(65) Prior Publication Data
US 2017/0337698 A1 Nov. 23, 2017

(30) Foreign Application Priority Data
Mar. 4, 2015 (JP) .................................. 2015-041921

(51) Int. Cl.
*G06T 7/00* (2017.01)
*G06T 7/246* (2017.01)
(Continued)

(52) U.S. Cl.
CPC .............. *G06T 7/246* (2017.01); *G06T 7/194* (2017.01); *G06T 7/20* (2013.01); *G06T 7/73* (2017.01);
(Continued)

(58) Field of Classification Search
CPC ........... G06T 7/246; G06T 7/194; G06T 7/73; G06T 2207/10016; G06T 2207/30196; G06T 2207/30221
See application file for complete search history.

(56) References Cited

U.S. PATENT DOCUMENTS 6,141,041 A * 10/2000 Carlbom ............ A63B 24/0003
348/157
8,751,191 B2 6/2014 Kawaguchi et al.
(Continued)

FOREIGN PATENT DOCUMENTS

JP 2009-211274 A 9/2009

OTHER PUBLICATIONS

Yamamoto et al., "Player Tracking and Identification Using Group Area Estimation and Uniform Number Recognition in Sports Video", SSII2013 Journal of the 19th Symposium on Sensing via Image Information, Jun. 14, 2013 pp. IS3-26-1 to IS3-26-4.*
(Continued)

*Primary Examiner* — Ping Y Hsieh
(74) *Attorney, Agent, or Firm* — Greenblum & Bernstein, P.L.C.

(57) ABSTRACT

The present disclosure provides a person tracking method of tracking a person with high precision. According to a person tracking method and a person tracking device of the present disclosure, a processor determines coordinates of a plurality of persons of a video within the video. The processor specifies a group area as an area where the persons of the video are dense. The processor tracks coordinates of a
(Continued)

certain person within the video. The processor determines a locus of coordinates of the certain person in the group area based on coordinates of the certain person out of the group area and a number depicted on a clothing.

10 Claims, 5 Drawing Sheets

(51) Int. Cl.
    *G06T 7/20* (2017.01)
    *G06T 7/194* (2017.01)
    *G06T 7/73* (2017.01)

(52) U.S. Cl.
    CPC ............. *G06T 2207/10016* (2013.01); *G06T 2207/30196* (2013.01); *G06T 2207/30221* (2013.01); *G06T 2207/30241* (2013.01)

(56) References Cited

U.S. PATENT DOCUMENTS

| | | | |
|---|---|---|---|
| 9,191,633 | B2 | 11/2015 | Fujimatsu et al. |
| 9,251,599 | B2 | 2/2016 | Hirasawa et al. |
| 9,357,181 | B2 | 5/2016 | Fujimatsu et al. |
| 2009/0220123 | A1 | 9/2009 | Tojo et al. |
| 2016/0063731 | A1 | 3/2016 | Yamamoto et al. |
| 2017/0124388 | A1 | 5/2017 | Ueda |
| 2017/0206932 | A1 | 7/2017 | Kawaguchi et al. |

OTHER PUBLICATIONS

Yamamoto et al., "Player Tracking and Identification Using Group Area Estimation and Uniform Number Recognition in Sports Video", SSII2013 Journal of the 19th Symposium on Sensing via Image Information, Jun. 14, 2013, pp. IS3-26-1 to IS3-26-4.

Misu et al., "Indentification Method of Athletes for Moving Images Based on Cooperationof Object Tracking and Uniform Number Recognition", Information technology letters (FIT2003), vol. 2, Aug. 25, 2003, pp. 187-189.

Lowe, "Distinctive Image Features from Scale-Invariant Keypoints", International Journal of Computer Vision, 60(2), 2004, pp. 91-110.

U.S. Appl. No. 15/548,210 to Sonoko Hirasawa et al., filed Aug. 2, 2017.

Search Report issued in International Patent Application No. PCT/JP2016/000817, dated May 10, 2016.

The Extended European Search Report dated Dec. 19, 2017 for the related European Patent Application No. 16758606.4.

Junliang Xing et al: "Multiple Player Tracking in Sports Video: A Dual-Mode Two-Way Bayesian Inference Approach With Progressive Observation Modeling", IEEE Transactions on Image Processing, IEEE Service Center, Piscataway, NJ, US, vol. 20, No. 6, Jun. 1, 2011 (Jun. 1, 2011), pp. 1652-1667, XP011411822.

Fukui K et al: "Multiple object tracking system with three level continuous processes", Applications of Computer Vision, Proceedings, 1992., IEEE Workshop on Palm Springs, CA, USA Nov. 30-2 Dec. 1, Los Alamitos, CA, USA, IEEE Comput. Soc, US, Nov. 30, 1992 (Nov. 30, 1992), pp. 19-27, XP010029166.

Eguiraun Harkaitz et al: "Evolution of Shannon entropy in a fish system (European seabass, *Dicentrarchus abrax*) during the recuperation period after exposure to methylmercury", 2015 4th International Work Conference on Bioinspired Intelligence (IWOBI), IEEE, Jun. 10, 2015 (Jun. 10, 2015), pp. 61-66, XP033176811.

\* cited by examiner

PERSON TRACKING METHOD AND PERSON TRACKING DEVICE

TECHNICAL FIELD

The present disclosure relates to a person tracking method and a person tracking device.

BACKGROUND ART

PTL 1 includes selection means for selecting one of a plurality of detection means based on a congestion degree determined by determination means, and count means for counting the number of subjects included in a frame image acquired by acquisition means based on the detection result detected from the frame image by using detection means selected by the selection means. By doing this, even in a case where a congestion degree is high and the subject is easily superimposed on the subject, it is possible to detect the subjects with high precision, and it is possible to count the number of subjects.

CITATION LIST

Patent Literature

PTL 1: Japanese Patent Unexamined Publication No. 2009-211274

Non Patent Literature

NPTL 1: D. G. Lowe, "Distinctive Image Features from Scale Invariant Keypoints," (USA), International Journal of Computer Vision, 60, 2 (2004), pp. 91-110.

SUMMARY OF THE INVENTION

The present disclosure provides a person tracking method of tracking a person with high precision.

In a person tracking method performed by a person tracking device of the present disclosure, a processor determines coordinates of a plurality of persons of a video within the video. The processor specifies a group area as an area where the persons of the video are dense. The processor tracks coordinates of a certain person within the video. The processor determines a locus of coordinates of the certain person in the group area based on coordinates of the certain person out of the group area and a number depicted on a clothing.

The person tracking method and the person tracking device of the present disclosure are useful in tracking the person with high precision.

DESCRIPTION OF EMBODIMENTS

Figure 1:
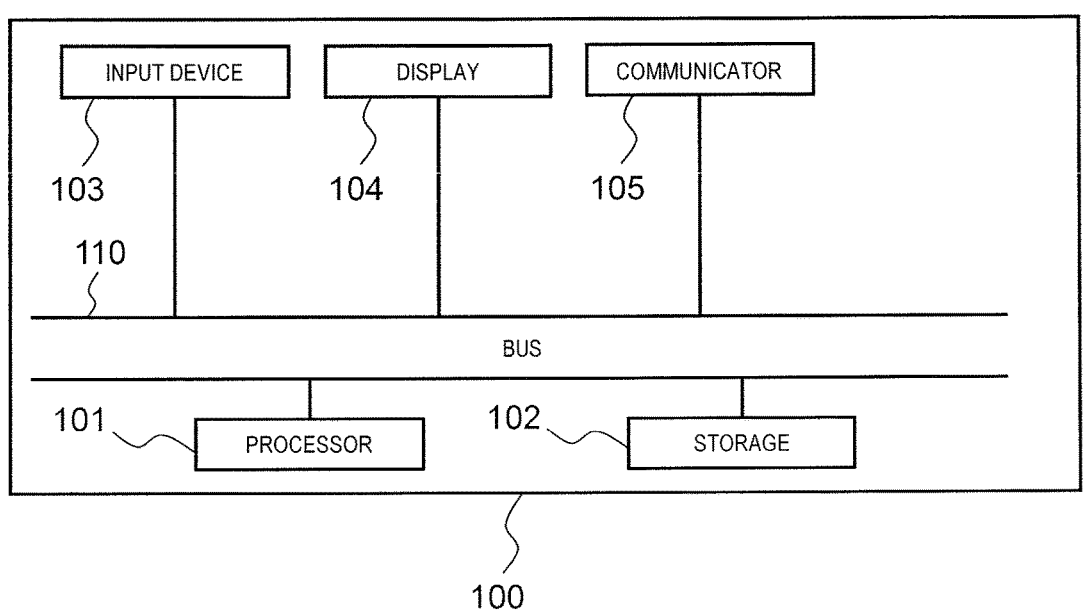
FIG. 1 is a block diagram of a person tracking device according to Exemplary Embodiment 1.

Hereinafter, exemplary embodiments will be described in detail by appropriately referring to the drawings. Here, unnecessarily detailed description may be omitted. For example, detailed description of already well-known matters or redundant description of substantially same configurations may be omitted. By doing this, it is easy for those skilled in the art to understand the present disclosure by preventing the following description from being unnecessarily redundant.

The accompanying drawings and the following description are provided in order for those skilled in the art to sufficiently understand the present disclosure, and are not intended to limit the subject matter described in claims.

Exemplary Embodiment 1

Hereinafter, Exemplary Embodiment 1 will be described with reference to FIGS. 1 to 8.

[1-1. Configuration]

FIG. 1 is a block diagram of a person tracking device according to Exemplary Embodiment 1.

Person tracking device 100 includes processor 101, storage 102, input device 103, display 104, communicator 105, and bus 110.

Processor 101 controls other elements of person tracking device 100 through bus 110. As one example, processor 101 may be constituted by a general-purpose central processing unit (CPU). Processor 101 may execute a specific program.

Storage 102 acquires various information items from other elements, and retains these information items temporarily or permanently. Storage 102 may be a generic term of a so-called primary storage device and a so-called secondary storage device, and multiple storages 102 may be physically provided. For example, a dynamic random access memory (DRAM), a hard disk drive (HDD), or a solid state drive (SSD) is used in the configuration of storage 102.

Input device 103 receives information from the outside. The information received by input device 103 from the outside includes information regarding an input from an operator of person tracking device 100. As one example, input device 103 may be constituted by an input interface such as a keyboard.

Display 104 presents information to the outside. Display 104 is an example of an output device. Person tracking device 100 may output information to a device other than the display by using various output interfaces.

Communicator 105 communicates with an external device through a communication path. As one example, communicator 105 may be constituted by a communication interface capable of communicating with an existing communication network such as a 3G communication network or a wireless LAN communication network.

The configuration of person tracking device 100 described above is an example. The terminal may be constituted by integrating some of the respective components of person tracking device 100. The terminal may be constituted by dividing some of the respective components of person tracking device 100 into a plurality of elements. Some of the respective components of person tracking device 100 may be omitted. The terminal may be constituted by adding other elements to person tracking device 100.

[1-2. Operation]

Figure 2:
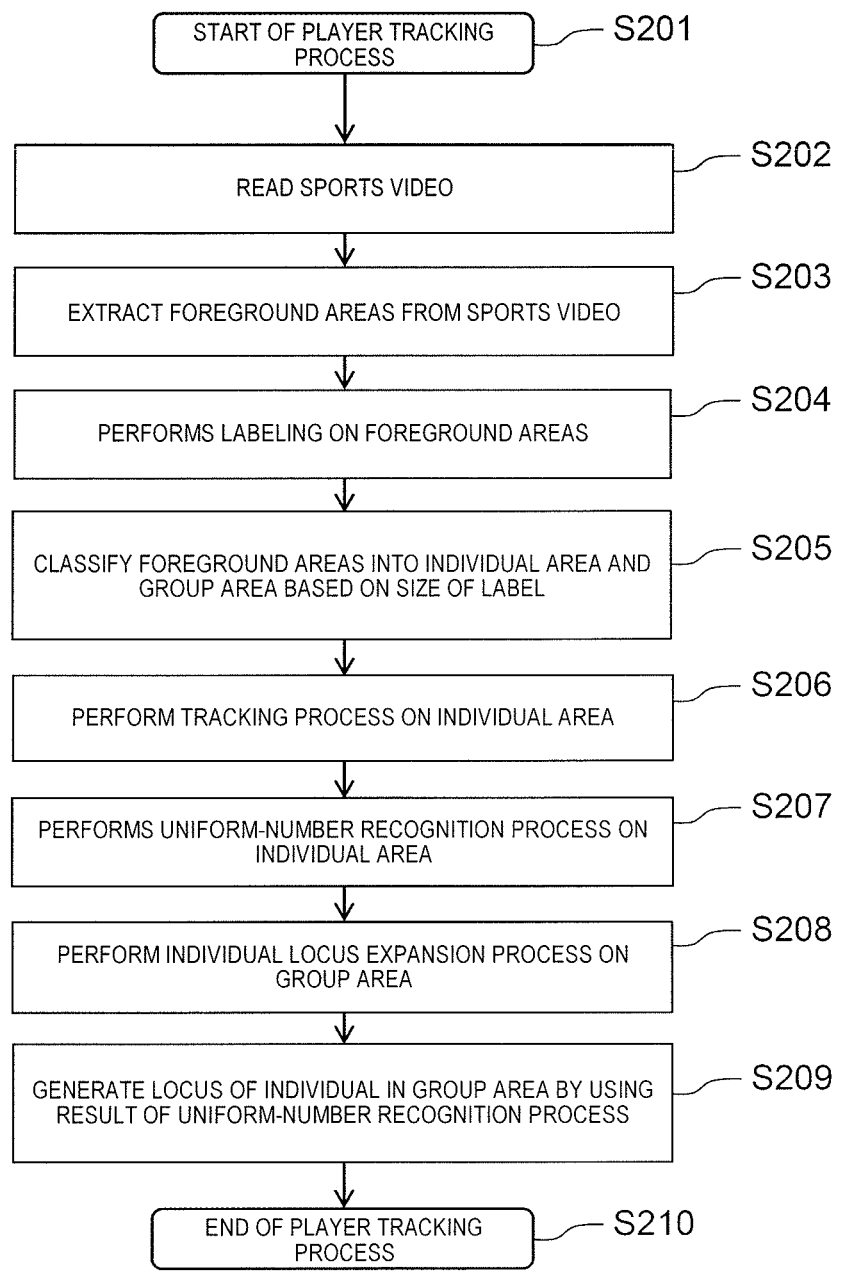
FIG. 2 is a flowchart of a person tracking process according to Exemplary Embodiment 1.

An operation when the person tracking device described above performs a person tracking process will be described below FIG. 2 is a flowchart of a person tracking process according to Exemplary Embodiment 1.

Processor 101 of person tracking device 100 primarily performs the respective steps of the flowchart shown in FIG. 2. The respective steps of the flowchart shown in FIG. 2 are performed on a plurality of frame images constituting a sports video in parallel or in sequence. In the present disclosure, a case where the "processor performs" is not limited to a case where the same (single) processor performs the entire process. In the present disclosure, a case where the "processor performs" includes an aspect in which another processor performs a part of the process.

In the present exemplary embodiment, a process of tracking a player of the sports video will be described as an example of the person tracking process.

In step S201, processor 101 starts a player tracking process. In the present disclosure, the player tracking process means that coordinates of the player of the sports video at each time point within the video are determined. In the present disclosure, a case where the "coordinates are determined" includes both a concept that unique coordinates are specified and a concept that a coordinate area is specified with a predetermined width. It is not necessary to perform the player tracking process on the entire video, and an aspect in which the player tracking process is performed on only a part thereof. As an example of a timing when processor 101 starts the player tracking process, there is a timing when the player tracking process is started based on information from input device 103.

In step S202, processor 101 reads the sports video. As one example, processor 101 reads the sports video which is previously recorded in storage 102, and thus, step S202 is performed. As another method, processor 101 reads the sports video transmitted from an external device through communicator 105, and thus, step S202 is performed.

Figure 3:
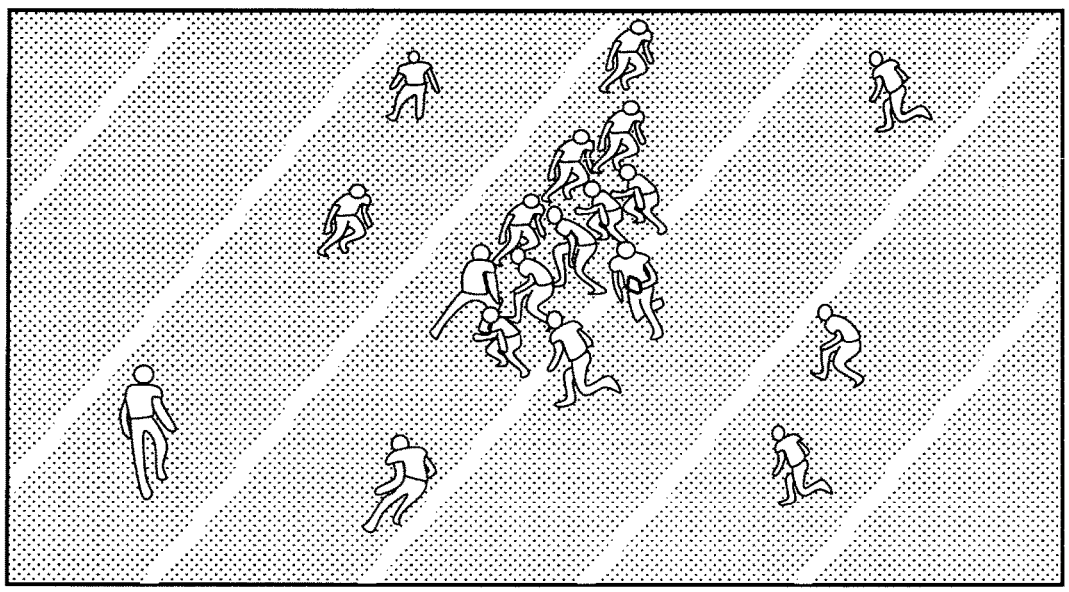
FIG. 3 is a diagram showing a sports video according to Exemplary Embodiment 1.

FIG. 3 is a diagram showing the sports video according to Exemplary Embodiment 1.

As shown in FIG. 3, in the present exemplary embodiment, a video acquired by capturing the American football game is used as an example of the sports video. In addition to the American football, a video of a sport such as soccer, basketball, or ice hockey which is played by two teams may be used as the sports video.

In step S203, processor 101 extracts foreground areas from the sports video. The foreground area is a concept of an area paired with a background area. As the background area of the sports video, there are a field and an installed object. As the foreground area of the sports video, there is a player or a ball. In the present exemplary embodiment, the foreground areas are extracted in order to distinguishably extract the player from the sports video.

Processor 101 extracts the foreground areas by performing a background difference process on the sports video. The background difference process refers to a process of specifying an area where a previous image is not present in a subsequent image by comparing the previous image and the subsequent image in the video in a sequence of time. The foreground area is specified by performing the background difference process.

Processor 101 performs the background difference process on the sports video by calculating a mixture of Gaussian distribution (MoG) of the sports video.

Figure 4:
FIG. 4 is a diagram showing a foreground area of the sports video according to Exemplary Embodiment 1.

FIG. 4 is a diagram showing the foreground areas of the sports video according to Exemplary Embodiment 1. In FIG. 4, a white portion is the foreground, and a black portion is the background. As shown in FIG. 4, the foreground areas substantially match with player areas. The foreground areas shown in FIG. 4 are extracted by performing the background difference process using the calculation of MoG on the sports video shown in FIG. 3.

In step S204, processor 101 performs labelling on the foreground areas. The labelling means that the foreground area is able to be recognized for each predetermined mass. Processor 101 may recognize the foreground area for each predetermined mass by specifying an area where pixels of the foreground area are continuous and assigning recognizable information to the specified area. Processor 101 defines a size of a label of the foreground area by calculating a rectangle including the labelled area.

Figure 5:
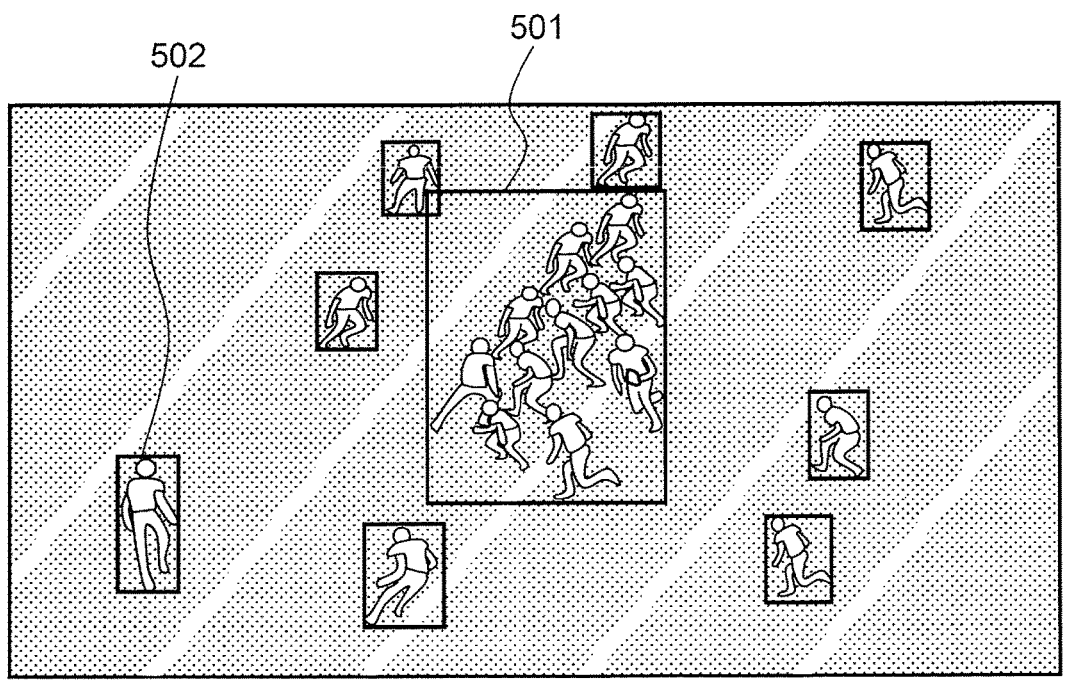
FIG. 5 is a diagram showing a state in which the foreground area of the sports video according to Exemplary Embodiment 1 is labelled.

FIG. 5 is a diagram showing a state in which the foreground areas of the sports video according to Exemplary Embodiment 1 are labelled. FIG. 5 shows a result acquired by superimposing the labelling result on not the foreground areas but the sports video. As shown in FIG. 5, since the foreground areas are continuous in a place where the foreground areas (players) are dense in a center, a rectangular area such as label 501 becomes larger. Meanwhile, in a case where the foreground area corresponds to approximately one player as in another place, a rectangular area such as label 502 is smaller than label 501.

In step S205, processor 101 classifies the foreground areas into an individual area and a group area based on the size of the label. As described in step S204, the size of the label has an affinity with density of the players. If the size of the label is large, there is a high possibility that the persons (players) will be dense, and if the size of the label is small, there is a low possibility that the players will be dense. Processor 101 uses a size of a label having about a size of label 502 dotted with one player as a threshold, and classifies areas of the foreground areas which are included in the labels which are greater than the threshold as the group area and areas thereof which are included in the labels which are equal to or less than the threshold as the individual area. In the present exemplary embodiment, the individual area is specified, and thus, another process is performed by regarding the presence of a certain specific person in the individual area as being specified.

In step S206, processor 101 performs a tracking process on the areas classified as the individual area in step S205. The tracking process is a process of specifying coordinates of objects that move in the respective frames constituting the video. As means of the tracking process, a known technology may be applied. In the present exemplary embodiment, it is determined how the rectangles of the individual areas are changed in the respective frame images constituting the sports video by the tracking process using a Kalman filter. The tracking process is performed on the individual area, and it is not necessary to perform the tracking process in the group area. In a case where the individual area is included in the group area, the tracking process is stopped. In a case where the individual area is distant from the group area, the tracking process is performed again. In a case where the individual area appears newly, the tracking process is performed on the appeared individual area.

In step S207, processor 101 performs a uniform-number recognition process on the areas classified as the individual area in step S205. The uniform-number recognition process is a process of recognizing the number depicted on person's clothing on the assumption that the person is present in the individual area. The uniform-number recognition process may be performed in parallel with step S206, or may be performed before step S207.

In the present exemplary embodiment, processor 101 recognizes the uniform number by using a learning result acquired by viewpoint generation learning which is a kind of machine learning. The viewpoint generation learning is a method of generating a viewpoint change image group which is an image group acquired by capturing a uniform number image facing the front from a plurality of viewpoints by using the uniform number image as a template image and learning the generated viewpoint change image group.

In the present exemplary embodiment, it is preferable that the uniform number image of the player appearing in the sports video is previously acquired as the template image, but the image facing the front selected from the sports video itself may be used as the template image.

Processor 101 virtually generates images acquired when the template image is viewed from various viewpoints, from the template image. The images acquired in this manner are called the viewpoint change image group. The viewpoint change image group may be acquired by performing an affine transformation on the template image. Rotation matrix R for the affine transformation is expressed by the following expression.

$$R = \begin{bmatrix} \cos\psi & -\sin\psi & 0 \\ \sin\psi & \cos\psi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} 1 & 0 & 0 \\ 0 & \cos\varphi & -\sin\varphi \\ 0 & \sin\varphi & \cos\varphi \end{bmatrix}$$ [Expression 1]

Where, $\psi$, $\theta$, and $\varphi$ are angles related to the rotation, respectively. The angles $\theta$ and $\varphi$ respectively correspond to longitude and latitude of a hemisphere of the Earth when the template image is placed on a bottom of the hemisphere. In the present exemplary embodiment, the angle $\theta$ and the angle $\varphi$ are values of the angles from −90 degrees to 90 degrees with increment of 10 degrees. The angle $\psi$ is a rotation angle of the viewpoint from a top of the hemisphere toward the template image in an axial direction. In the present exemplary embodiment, as will be described below, scale-invariant feature transform (SIFT) features having invariance to a change of the rotation angle is extracted from the viewpoint change image group. Thus, the angle $\psi$ is fixed at 0 degrees. As a result, 360 viewpoint change images (group) acquired by subtracting one template image from 361 images of 19×19 are acquired.

Processor 101 extracts the SIFT features from the viewpoint change image acquired in this manner. The SIFT features are extracted by using an existing algorithm acquired by D. G. Lowe (NPTL1). The SIFT features are features appearing in common between the respective viewpoint change images. Processor 101 calculates the number of features of the extracted SIFT features. In the present exemplary embodiment, the number of features is defined by a gradient of luminance around the features. The number of features is defined for the number of viewpoint change images (360 images) at the respective features, but a reduction in the number of features (a reduction in feature space) may be performed by performing a clustering process for the sake of simplicity in the calculation. By doing this, the features and the number of features are calculated for each uniform number.

Processor 101 recognizes the uniform number by using the features and the number of features for each uniform number acquired in this manner. The features and the number of features may be calculated using values calculated by another device. In a normal case, a shape of the uniform number is different depending on a team to which the player belongs. In the present exemplary embodiment, it is possible to recognize the team to which the player belongs by recognizing the uniform number.

Processor 101 specifies an area of the uniform number from the individual area, and extracts the number of SIFT features from the area of the uniform number. Processor 101 may specify a location in which a main part (head, lumbus, or backbone) of the person is located in the individual area by recognizing the known person in the individual area. Processor 101 specifies an area of the backbone of the person, as an area where the uniform number is present. Processor 101 specifies the uniform number indicated by the area of the uniform number by comparing (matching) the number of SIFT features extracted in this manner with the number of SIFT features acquired from the template image and the viewpoint change image group. As the comparison (matching) of the numbers of SIFT features, brute-force matching which is a known matching method may be used.

In step S208, processor 101 performs an individual locus expansion process on the areas classified as the group area in step S205.

The individual locus expansion process will be described with reference to FIGS. 6 and 7.

Figure 6:
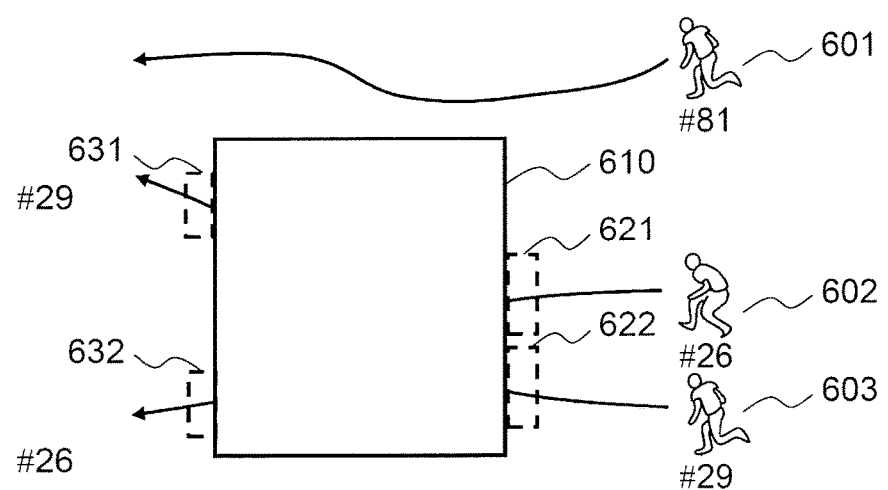
FIG. 6 is a diagram showing a state in which the person tracking process and a uniform-number recognition process according to Exemplary Embodiment 1 are performed.

FIG. 6 is a diagram showing a case where the person tracking process and the uniform-number recognition process according to Exemplary Embodiment 1 are performed. FIG. 7 is a diagram showing an example of the individual locus expansion process according to Exemplary Embodiment 1.

In a stage in which step S208 is started, processor 101 completes the person tracking process and the uniform-number recognition process. Thus, one section of the sports video is represented as FIG. 6. In FIG. 6, three players of player 601, player 602, and player 603 are present. In FIG. 6, a number assigned # is the uniform number. In FIG. 6, arrow represents a locus of the player.

As shown in FIG. 6, the uniform numbers of player 601, player 602, and player 603 are specified as "81", "26", and "29" by performing the uniform-number recognition process.

As shown in FIG. 6, the fact that player 601 moves from the right to the left without approximating another player and the coordinates of the player are specified by performing the person tracking process on the individual area. Meanwhile, since player 602 and player 603 move to group area 610 in the middle of the sports video, the individual is not tracked in the middle of the sports video (or reliability of the coordinates thereof is low even though the individual is tracked).

In the present exemplary embodiment, the player is tracked in the entire sports video by determining the locus of the coordinates of players 602 and 603 within the group area 610.

The individual locus expansion process in step S208 is a pre-process for determining the locus of the coordinates of the player within group area 610 with higher precision. Thus, in the present disclosure, it is not necessary to perform step S208, but it is preferable that this step is performed.

Processor 101 determines a part of the locus of the player within the group area 610 based on the coordinates and velocity of the player who enters group area 610.

Specifically, processor 101 calculates velocity vectors of player 602 and player 603 of individual area 622 and individual area 621 including coordinates in which player 602 and player 603 enter group area 610.

Processor 101 specifies the velocity vectors of individual area 621 and individual area 622 by calculating an optical flow of individual area 621 and individual area 622. It is assumed that a size of the individual area required for calculating the optical flow is constant.

Processor 101 may determine that the individual area is moved from the coordinates of the individual area by a predetermined distance and direction based on a velocity and a direction indicated by the velocity vector. Thus, processor 101 may calculate locations of group area 610 in which the individual area 621 and individual area 622 are moved in the subsequent frame of the sports video.

Processor 101 performs the same process on the coordinates and velocity of the player who leaves group area 610. Specifically, processor 101 calculates the velocity vectors of player 602 and player 603 of individual area 631 and individual area 632 including coordinates in which player 602 and player 603 leave from group area 610. In this case, the processor deals velocity vectors in an opposite direction to the group area from individual area 631 and individual area 632.

Figure 7:
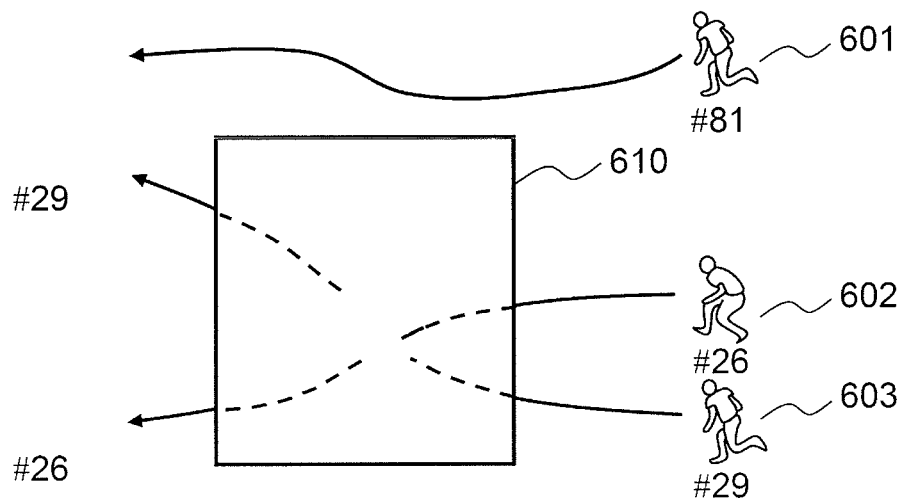
FIG. 7 is a diagram showing a state in which an individual locus expansion process according to Exemplary Embodiment 1 is performed.

Processor 101 may expand the locus in group area 610 as represented as a broken line of FIG. 7 by calculating a moving destination or a moving departure of the individual area over several frames (for example, 20 frames).

In a case where the coordinates of the individual area acquired by the velocity vector are excessively distant from the coordinates of the moving departure or the moving destination, there is a high possibility of erroneous detection. Thus, in a case where it is determined that a change in angle of the velocity vector is out of a range of a predetermined threshold (for example, 25 degrees) when viewed from the moving departure or the moving destination, it is preferable that the individual locus expansion process is ended.

Processor 101 generates the locus of the individual in the group area by using the result of the uniform-number recognition process in step S209.

Processor 101 calculates a connectivity probability which is a correct answer probability that i and j will be connected to all combinations of an end point i of the locus entering group area 610 and a start point j of the locus leaving group area 610 under the following conditions. Here, in step S209, in a case where the individual locus expansion process is performed, the same process is performed on the end point and the start point of the expanded locus.

$$P_{ij} = W_N N_{ij} + W_T T_{ij} + W_V V_{ij} + W_A A_{ij} \quad \text{[Expression 2]}$$

$$W_N + W_T + W_V + W_A = 1 \quad \text{[Expression 3]}$$

$$W_N = 0.25 \; W_T = 0.2 \; W_V = 0.25 \; W_A = 0.3 \quad \text{[Expression 4]}$$

$$N_{ij} = \begin{cases} 1 & \text{same uniform number} \\ 0 & \text{different uniform number} \end{cases} \quad \text{[Expression 5]}$$

$$T_{ij} = \begin{cases} 1 & \text{same team} \\ 0 & \text{different team} \end{cases} \quad \text{[Expression 6]}$$

$$V_{ij} = \exp\left(-\frac{a^2}{100^2}\right) \quad \text{[Expression 7]}$$

$$A_{ij} = \exp\left(-\frac{d^2}{30^2}\right) \quad \text{[Expression 8]}$$

Where, $N_{ij}$ may be calculated based on the result of the uniform-number recognition process.

$T_{ij}$ may be calculated by calculating of a color histogram of the individual area or the result of the uniform-number recognition process.

$V_{ij}$ represents similarity of the velocity. In the definition of $V_{ij}$, a is an angel formed by the velocity vector at the end point of the locus entering group area 610 and the velocity vector at the start point of the locus leaving group area 610.

$A_{ij}$ represents a reaching degree. In the definition of $A_{ij}$, d is a distance between the coordinates of the end point of the locus entering group area 610 and the coordinates of the start point of the locus leaving group area 610.

In the present exemplary embodiment, the adding of weights to the above-described variables is set as represented in Expression 4. As represented in Expression 3, the sum of the weights to the respective variables is 1.

After the connectivity probability is calculated for all i and j in this manner, processor 101 specifies i and j capable of achieving overall optimization at the time of actual connection. In the present exemplary embodiment, the processor specifies a combination in which the total of the connectivity probabilities $P_{ij}$ of the combinations of i and j is a maximum value in the group area by using a known Hungarian algorithm.

By doing this, processor 101 determines the locus of the coordinates of the player in the group area. As another aspect of the present disclosure, the above-described process may be performed on the direction in which the individual area is moved on the assumption that the individual area moves in linear motion by simply using only the velocity in place of the velocity vector.

Figure 8:
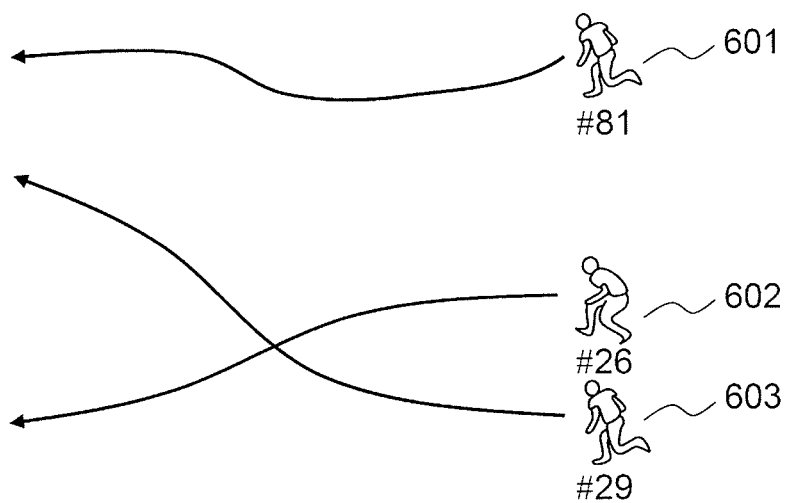
FIG. 8 is a diagram showing a locus generation process according to Exemplary Embodiment 1.

FIG. 8 is a diagram showing an example in which a locus generation process according to Exemplary Embodiment 1 is performed. Processor 101 performs step S209, and thus, the loci of the coordinates of players 602 and 603 within group area 610 which are unclear in FIG. 6 are determined as shown in FIG. 8.

[1-3. Advantages]

As described above, according to the present exemplary embodiment, in the person tracking method performed by person tracking device 100 of the present disclosure, processor 101 determines the coordinates of the plurality of persons of the video within the video. Processor 101 specifies the group area as the area where the persons of the video are dense. Processor 101 tracks the coordinates of a certain person within the video. Processor 101 determines the locus of the coordinates of a certain person within the group area based on the number depicted on the clothing and the coordinates of the certain person out of the group area.

Accordingly, even though the group area is present within the video and the persons block each other within the video, the processor may determine the locus by using the number based on the clothing. Thus, it is possible to track the person with high precision.

In the present disclosure, processor 101 recognizes the number depicted on the clothing of a certain person by using the machine learning result performed based on the viewpoint change image group which is the image group acquired by capturing the image indicating the number depicted on the clothing of the certain person from the plurality of viewpoints.

The shape and the rotation direction of the number depicted on the clothing are changed depending on the organization of the person, and thus, it is possible to recognize the number with high precision. Thus, it is possible to track the person with higher precision.

In the present disclosure, the video is a video acquired by capturing a sport played by two teams, the person wears the uniform having the uniform number depicted thereon, and the number is the uniform number recognized by the processor.

If the video is the video of the sport played by two teams, the uniform number is finite within at least one team, and may uniquely recognize the person. Accordingly, improvement of recognition precision of the number is expected. Thus, it is possible to track the person with higher precision.

In the present disclosure, processor 101 determines the locus of the coordinates of a certain person within the group area based on the coordinates of the certain person out of the group area, the number depicted on the clothing of the certain person, and the team to which the certain person belongs.

Accordingly, it is possible to determine the locus of the coordinates by adding information of the team in addition to the uniform number. Thus, it is possible to track the person with higher precision.

In the present disclosure, the coordinates out of the group area includes at least the coordinates of a certain person who enters the group area and the coordinates of the certain person who leaves the group area.

Accordingly, it is possible to specify the locus of the coordinates within the group area by selecting the combination the coordinates at the time of entering and the coordinates at the time of leaving. Thus, it is possible to track the person with higher precision.

In the present disclosure, processor 101 determines a part of the locus of the coordinates of a certain person within the group area based on the velocity of the certain person who invades the group area, and determines a part of the locus of the coordinates of the certain person within the group area based on the velocity of the certain person who leaves the group area.

Accordingly, it is possible to determine the coordinates of a certain person within the group area based on the velocity. Thus, it is possible to track the person with higher precision.

Another Exemplary Embodiment

As stated above, Exemplary Embodiment 1 has been described as an example of the technology disclosed in the present application. However, the technology of the present disclosure is not limited thereto, and may be applied to exemplary embodiments acquired by appropriately performing modification, replacement, addition, and omission on the above-described exemplary embodiment. A new exemplary embodiment may be acquired by combining the respective components described in Exemplary Embodiment 1 described above.

The above-described exemplary embodiment is provided to illustrate the technology of the present disclosure, and may be variously modified, replaced, added, and omitted in claims or an equivalent scope.

INDUSTRIAL APPLICABILITY

The present disclosure is applicable to a device that analyzes a behavior by tracking a person within a video.

REFERENCE MARKS IN THE DRAWINGS 100 person tracking device
101 processor
102 storage
103 input device
104 display
105 communicator
110 bus
501 label
502 label
601 player
602 player
603 player
610 group area
621 individual area
622 individual area
631 individual area
632 individual area

The invention claimed is:

1. A person tracking method of causing a processor to determine coordinates of a plurality of persons of a video within the video, the method comprising:
   causing the processor to specify a group area as an area where the persons within the video are dense;
   causing the processor to specify a predetermined person within the video;
   causing the processor to track coordinates of the predetermined person within the video; and
   causing the processor to determine a locus of coordinates of the predetermined person within the group area based on coordinates of the predetermined person out of the group area and a number depicted on a clothing of the predetermined person,
   wherein the coordinates out of the group area include at least coordinates of the predetermined person who enters the group area and coordinates of the predetermined person who leaves the group area, and
   the processor performs a process of expanding a locus within the group area by determining a part of the locus of the coordinates of the predetermined person within the group area based on a velocity of the predetermined person who enters the group area in a movement direction, and determining a part of the locus of the coordinates of the predetermined person within the group area based on a velocity of the predetermined person who leaves the group area in an opposite direction, such that the processor obtains an improved trajectory of the predetermined person.

2. The person tracking method of claim 1,
   wherein the processor ends the process of expanding the locus within the group area in a case where a part of the locus of the coordinates of the predetermined person within the group area is a predetermined value or more distant from the coordinates of the predetermined person who enters the group area or the coordinates of the predetermined person who leaves the group area.

3. The person tracking method of claim 1,
wherein the locus of the coordinates of the predetermined person within the group area is determined based on a correct answer probability that endpoints of the expanded locus are connected within the group area.

4. The person tracking method of claim 3,
wherein the correct answer probability that the endpoints of the expanded locus are connected is calculated based on a distance between the endpoints of the expanded locus.

5. The person tracking method of claim 1,
wherein:
the predetermined person is two predetermined persons including a first predetermined person and a second predetermined person;
the processor is further caused to determine:
  a first locus of coordinates of the first predetermined person within the group area based on coordinates of the first predetermined person out of the group area and a first number depicted on a clothing of the first predetermined person, and
  a second locus of coordinates of the second predetermined person within the group area based on coordinates of the second predetermined person out of the group area and a second number depicted on a clothing of the second predetermined person
the coordinates of the first predetermined person out of the group area include at least coordinates of the first predetermined person who enters the group area and coordinates of the first predetermined person who leaves the group area,
the coordinates of the second predetermined person out of the group area include at least coordinates of the second predetermined person who enters the group area and coordinates of the second predetermined person who leaves the group area;
and
the processor performs a process of:
  expanding a locus within the group area by determining a part of the locus of the coordinates of the first predetermined person within the group area based on a velocity of the first predetermined person who enters the group area in a first movement direction, and determining a part of the locus of the coordinates of the first predetermined person within the group area based on a velocity of the first predetermined person who leaves the group area in a direction opposite the first direction, and
  expanding a locus within the group area by determining a part of the locus of the coordinates of the second predetermined person within the group area based on a velocity of the second predetermined person who enters the group area in a second movement direction, and determining a part of the locus of the coordinates of the second predetermined person within the group area based on a velocity of the second predetermined person who leaves the group area in a direction opposite the second direction.

6. A person tracking device that includes a processor, and a storage, and causes the processor to determine coordinates of a plurality of persons of a video recorded in the storage within the video,
wherein the processor
  specifies a group area as an area where the persons within the video are dense,
  specifies a predetermined person within the video,
  tracks coordinates of the predetermined person within the video, and
  determines a locus of coordinates of the predetermined person within the group area based on coordinates of the predetermined person out of the group area and a number depicted on a clothing of the predetermined person,
the coordinates out of the group area include at least coordinates of the predetermined person who enters the group area and coordinates of the predetermined person who leaves the group area, and
the processor performs a process of expanding a locus within the group area by determining a part of the locus of the coordinates of the predetermined person within the group area based on a velocity of the predetermined person who enters the group area in a movement direction and determining a part of the locus of the coordinates of the predetermined person within the group area based on a velocity of the predetermined person who leaves the group area in an opposite direction, such that the processor obtains an improved trajectory of the predetermined person.

7. The person tracking device of claim 6,
wherein the processor ends the process of expanding the locus within the group area in a case where a part of the locus of the coordinates of the predetermined person within the group area is a predetermined value or more distant from the coordinates of the predetermined person who enters the group area or the coordinates of the predetermined person who leaves the group area.

8. The person tracking device of claim 6,
wherein the locus of the coordinates of the predetermined person within the group area is determined based on a correct answer probability that endpoints of the expanded locus are connected within the group area.

9. The person tracking device of claim 8,
wherein the correct answer probability that the endpoints of the expanded locus are connected is calculated based on a distance between the endpoints of the expanded locus.

10. The person tracking device of claim 6,
wherein:
the predetermined person is two predetermined persons including a first predetermined person and a second predetermined person;
the processor is further caused to determine:
  a first locus of coordinates of the first predetermined person within the group area based on coordinates of the first predetermined person out of the group area and a first number depicted on a clothing of the first predetermined person, and
  a second locus of coordinates of the second predetermined person within the group area based on coordinates of the second predetermined person out of the group area and a second number depicted on a clothing of the second predetermined person
the coordinates of the first predetermined person out of the group area include at least coordinates of the first predetermined person who enters the group area and coordinates of the first predetermined person who leaves the group area,
the coordinates of the second predetermined person out of the group area include at least coordinates of the second predetermined person who enters the group area and coordinates of the second predetermined person who leaves the group area;
and the processor performs a process of:
expanding a locus within the group area by determining a part of the locus of the coordinates of the first predetermined person within the group area based on a velocity of the first predetermined person who enters the group area in a first movement direction, and determining a part of the locus of the coordinates of the first predetermined person within the group area based on a velocity of the first predetermined person who leaves the group area in a direction opposite the first direction, and expanding a locus within the group area by determining a part of the locus of the coordinates of the second predetermined person within the group area based on a velocity of the second predetermined person who enters the group area in a second movement direction, and determining a part of the locus of the coordinates of the second predetermined person within the group area based on a velocity of the second predetermined person who leaves the group area in a direction opposite the second direction.

* * * * *